(12) United States Patent
Gruber

(10) Patent No.: US 11,130,413 B2
(45) Date of Patent: Sep. 28, 2021

(54) ARRANGEMENT OF MULTIPLE ELECTRICAL MACHINES FOR A VEHICLE FOR IMPROVING THE ENERGY SUPPLY WHILE REDUCING INSTALLATION SPACE AND WEIGHT

(71) Applicant: Bayerische Motoren Werke Aktiengesellschaft, Munich (DE)

(72) Inventor: Dominik Gruber, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 134 days.

(21) Appl. No.: 16/364,276

(22) Filed: Mar. 26, 2019

(65) Prior Publication Data

US 2019/0217727 A1    Jul. 18, 2019

Related U.S. Application Data

(63) Continuation of application No. PCT/EP2017/080446, filed on Nov. 27, 2017.

(30) Foreign Application Priority Data

Dec. 15, 2016  (DE) .................... 10 2016 225 107.4

(51) Int. Cl.
*B60L 53/22*  (2019.01)
*B60L 58/20*  (2019.01)
(Continued)

(52) U.S. Cl.
CPC ............... *B60L 53/22* (2019.02); *B60L 53/14* (2019.02); *B60L 53/20* (2019.02); *B60L 58/20* (2019.02);
(Continued)

(58) Field of Classification Search
CPC .......... B60L 53/14; B60L 53/20; B60L 58/20; B60L 2220/42; B60L 53/22; H02J 7/342;
(Continued)

(56) References Cited

U.S. PATENT DOCUMENTS 5,907,194 A * 5/1999 Schenk .................... H02P 9/307
                                                        307/10.1
5,977,652 A * 11/1999 Frey ........................ H02J 9/002
                                                        307/10.1
(Continued)

FOREIGN PATENT DOCUMENTS

DE    10 2010 029 788 A1    12/2011
DE       102010029788 A1 *  12/2011    ............ H02J 7/1423
(Continued)

OTHER PUBLICATIONS

Tschoeke, "Die Elektrifizierung des Antriebsstrangs", 2015, pp. 80-85, Springer Vieweg (15 pages).
(Continued)

*Primary Examiner* — Richard Isla
*Assistant Examiner* — Manuel Hernandez
(74) *Attorney, Agent, or Firm* — Crowell & Moring LLP

(57) ABSTRACT

An electrical machine arrangement for a motor vehicle includes a first electrical machine, a first energy store, which is connected to the first electrical machine for supplying power to the electrical machine, a second electrical machine, a second energy store, which is connected to the second electrical machine, for supplying power to the second electrical machine and which is connected to the first energy store by use of an intermediate circuit, and a coupling element. This coupling element is connected into the intermediate circuit and permits energy to be transmitted from (Continued)

the second energy store to the first energy store and can prevent energy transmission from the first energy store to the second energy store.

11 Claims, 6 Drawing Sheets

(51) Int. Cl.
  *B60L 53/14* (2019.01)
  *H02J 7/00* (2006.01)
  *H02J 7/02* (2016.01)
  *B60L 53/20* (2019.01)
  *H02J 7/34* (2006.01)

(52) U.S. Cl.
  CPC ........ *H02J 7/0003* (2013.01); *H02J 7/00047* (2020.01); *H02J 7/02* (2013.01); *H02J 7/022* (2013.01); *H02J 7/342* (2020.01); *B60L 2220/42* (2013.01); *H02J 2207/20* (2020.01)

(58) Field of Classification Search
  CPC ...... H02J 7/0003; H02J 7/022; H02J 7/00047; H02J 7/02; H02J 2207/20; Y02T 10/64; Y02T 10/70; Y02T 10/7072; Y02T 90/12; Y02T 90/14
  USPC .................................................. 320/103, 104
  See application file for complete search history.

(56) References Cited

U.S. PATENT DOCUMENTS

| | | |
|---|---|---|
| 2010/0222953 A1 | 9/2010 | Tang |
| 2011/0202220 A1 | 8/2011 | Seta et al. |
| 2013/0249287 A1* | 9/2013 | Feuerstack ............ H02J 7/1492 307/20 |
| 2013/0264869 A1 | 10/2013 | Klinkig et al. |
| 2015/0084345 A1* | 3/2015 | Klinkig ................... B60R 16/03 290/38 E |
| 2016/0016483 A1* | 1/2016 | Yasunori ................ B60L 58/20 320/162 |
| 2016/0294182 A1* | 10/2016 | Li ......................... H02M 3/158 |
| 2019/0222053 A1* | 7/2019 | Gruber ..................... H02J 7/04 |

FOREIGN PATENT DOCUMENTS

| | | |
|---|---|---|
| DE | 10 2011 101 531 A1 | 11/2012 |
| DE | 10 2012 209 631 A1 | 12/2013 |
| DE | 10 2016 107 305 A1 | 10/2016 |
| WO | WO-2017202537 A1 * | 11/2017 ............. B60L 58/19 |

OTHER PUBLICATIONS

International Search Report (PCT/ISA/210) issued in PCT Application No. PCT/EP2017/080446 dated Mar. 6, 2018 with English translation (six (6) pages).
German-language Written Opinion (PCT/ISA/237) issued in PCT Application No. PCT/EP2017/080446 dated Mar. 6, 2018 (seven (7) pages).
German-language Search Report issued in counterpart German Application No. 102016225107.4 dated May 2, 2017 with partial English translation (10 pages).

* cited by examiner

ARRANGEMENT OF MULTIPLE ELECTRICAL MACHINES FOR A VEHICLE FOR IMPROVING THE ENERGY SUPPLY WHILE REDUCING INSTALLATION SPACE AND WEIGHT

CROSS REFERENCE TO RELATED APPLICATIONS

This application is a continuation of PCT International Application No. PCT/EP2017/080446, filed Nov. 27, 2017, which claims priority under 35 U.S.C. § 119 from German Patent Application No. 10 2016 225 107.4, filed Dec. 15, 2016, the entire disclosures of which are herein expressly incorporated by reference.

BACKGROUND AND SUMMARY OF THE INVENTION

The present invention relates to an electric machine arrangement for a motor vehicle and to a motor vehicle equipped with such an electric machine arrangement.

It is known, according to FIG. 1, to provide two energy stores 24, 34, which are designed as high-voltage stores (HVS) and able to be charged by way of a charging device 50', and two electric machines 22, 32, which are connected by way of a respective inverter 23 and 33, for the respective driving of the two vehicle axles, in an electric four-wheel drive for a motor vehicle. The two electrical machines and their associated high-voltage stores in this case meet different requirements or fulfil different functions. One store 24 can be designed in this case as a so-called high-power store (HP store) having power-optimized cells, the other store 34 can be designed as a so-called high-energy store (HE store) having energy-optimized cells. The electric machine 22 associated with the high-power store 24 is preferably an electric machine for acceleration and optimized for power density, whereas the electric machine 32 associated with the high-energy store 34 is an electric machine for constant travel and optimized for efficiency. In order to be able to ensure a charge balance between the two energy stores, a DC/DC converter 38 (having at least three load terminals) is provided in an intermediate circuit 39 between the two energy stores. It is disadvantageous that such a DC/DC converter requires additional installation space and involves corresponding switching losses or transmission losses.

The present invention is based on the object of eliminating these disadvantages and improving the energy supply in an electric machine arrangement for a motor vehicle that includes two electric machines to the extent that said arrangement requires less installation space and has reduced switching losses.

The electric machine arrangement according to the invention for a motor vehicle comprises a first electric machine, a first energy store connected to said first electric machine for supplying electrical power thereto, a second electric machine, and a second energy store connected to said second electric machine for supplying electrical power thereto. The second energy store is connected to the first energy store by way of an intermediate circuit. The electric machine arrangement according to the invention also has a two-pole coupling element (that is to say having just two load terminals) connected into the intermediate circuit, which coupling element permits energy to be transmitted from the second energy store to the first energy store and can prevent energy from being transmitted from the first energy store to the second energy store. In other words, energy can be transmitted in this way from the second energy store to the first energy store. On account of the mentioned configuration, a simple, small and cheap component can be used in the electric machine arrangement according to the invention instead of the expensive and large DC/DC converter, said component being able to take on the function of said DC/DC converter. Therefore, the installation space and the weight that a DC/DC converter would otherwise take up can be "saved". Furthermore, the switching losses otherwise occurring at the DC/DC converter can be prevented or greatly reduced, and costs can be saved by omitting the DC/DC converter.

Furthermore, the present invention has the advantage that, owing to the recharging of the first energy store from the second energy store, the advantages during propulsion of an electric vehicle with four-wheel drive can be maintained for a very long time, although generally the first energy store "responsible" for acceleration is smaller than the second energy store and therefore possibly depleted earlier.

Essential to this switching topology is the fact that the second energy store prescribes the state of charge of the first energy store so that the state of charge of the first energy store is always greater than or equal to that of the second energy store. That is to say, the first electric machine (for the high acceleration) is fed from the first energy store both indirectly via the coupling element and from the second energy store so that the power available for the first electric machine is equal to the sum of the powers of the first and the second energy store.

In an advantageous and cost-effective manner, the coupling element can consist of a diode—configured for appropriate powers.

As an alternative, in a likewise advantageous and cost-effective manner, the coupling element can consist of a power transistor having such a diode connected in parallel therewith, wherein, in this embodiment, a control circuit is also provided for turning on the power transistor and for switching the load flows in such a way that energy can be transmitted from the first energy store via the power transistor of the coupling element to the second energy store. This may be advantageous, for example, during recuperation.

According to one preferred embodiment, a charging device—generally provided in a motor vehicle anyway—in a parallel circuit with the coupling element is connected between the first energy store and the second energy store, wherein the charging device can likewise serve as a DC/DC converter for transmitting energy from the second energy store to the first energy store. According to this embodiment, the charging device comprises a primary side and a secondary side. Provided on the primary side is a first terminal for connection to an electrical power supply system, such as, for example, the known AC voltage system having a voltage of 230 V. Provided on the secondary side is a second terminal for connection to a second energy store of the electric machine arrangement for the motor vehicle. The charging device according to the invention has on the primary side a third terminal for connection to a first energy store of the electric machine arrangement and is furthermore equipped with a control circuit, which is often also referred to as a control structure, which can switch over the load flows or current flows so that current can flow from the second energy store via the second terminal to the first energy store via the third terminal. By charging the first energy store, the voltage in the intermediate circuit can be kept at the maximum possible level. As a result, the power of the first electric machine and hence the available acceleration of the motor vehicle can also be maximized since this power is proportional to the voltage in the intermediate circuit.

It may be advantageous when the third terminal and the first terminal are integrated to form a joint terminal. In this way, different plugs can be plugged in, for example, at the same terminal depending on requirements or the switching situation, for example a mains plug or a connecting plug to the first energy store, or it is possible to switch over between the two components of the integrated terminal.

According to one advantageous development of the electric machine arrangement according to the invention, a switching arrangement is provided, which makes it possible to produce and disconnect the connection between the first energy store and the third terminal of the charging device. By closing the switches (for example relays or contactors) of the switching arrangement, the charging device can therefore be brought into a switching state in which—when the first terminal is not connected—it is used to balance the two energy stores, wherein the charging device functions as a DC/DC converter when the first energy store is charged by the second energy store. In contrast, if the first terminal is connected to the electrical power supply and if the switches of the switching arrangement are open, the second energy store is charged, wherein the first energy store is also concomitantly charged by means of the coupling element.

According to one advantageous embodiment of the electric machine arrangement according to the invention, the first energy store is an energy store having power-optimized cells for providing a high power—for example for acceleration of the motor vehicle—and the second energy store is an energy store having energy-optimized cells for providing the highest possible amount of energy—for example for making the longest possible travel route possible (without large acceleration power levels).

The first energy store and the second energy store are preferably designed so that they have an operating voltage of 200 to 1000 V, preferably an operating voltage of 260 to 400 V.

According to one advantageous embodiment, the charging device is designed so that it is suitable for charging the first energy store designed as an energy store having power-optimized cells—that is to say for delivering a high power—and for charging the second energy store designed as an energy store having energy-optimized cells—that is to say for delivering the greatest possible amount of energy.

According to a further advantageous embodiment, the charging device according to the invention is designed so that it makes an operating voltage of 200 to 1000 V, preferably 260 to 400 V, in the energy stores possible.

The object mentioned at the beginning is furthermore achieved by a motor vehicle, which has an electric machine arrangement according to the invention. Accordingly, the same or similar advantages are also produced as those in connection with the above description, for which reason reference is made to the above statements in connection with the apparatus according to the invention in order to avoid repetitions.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
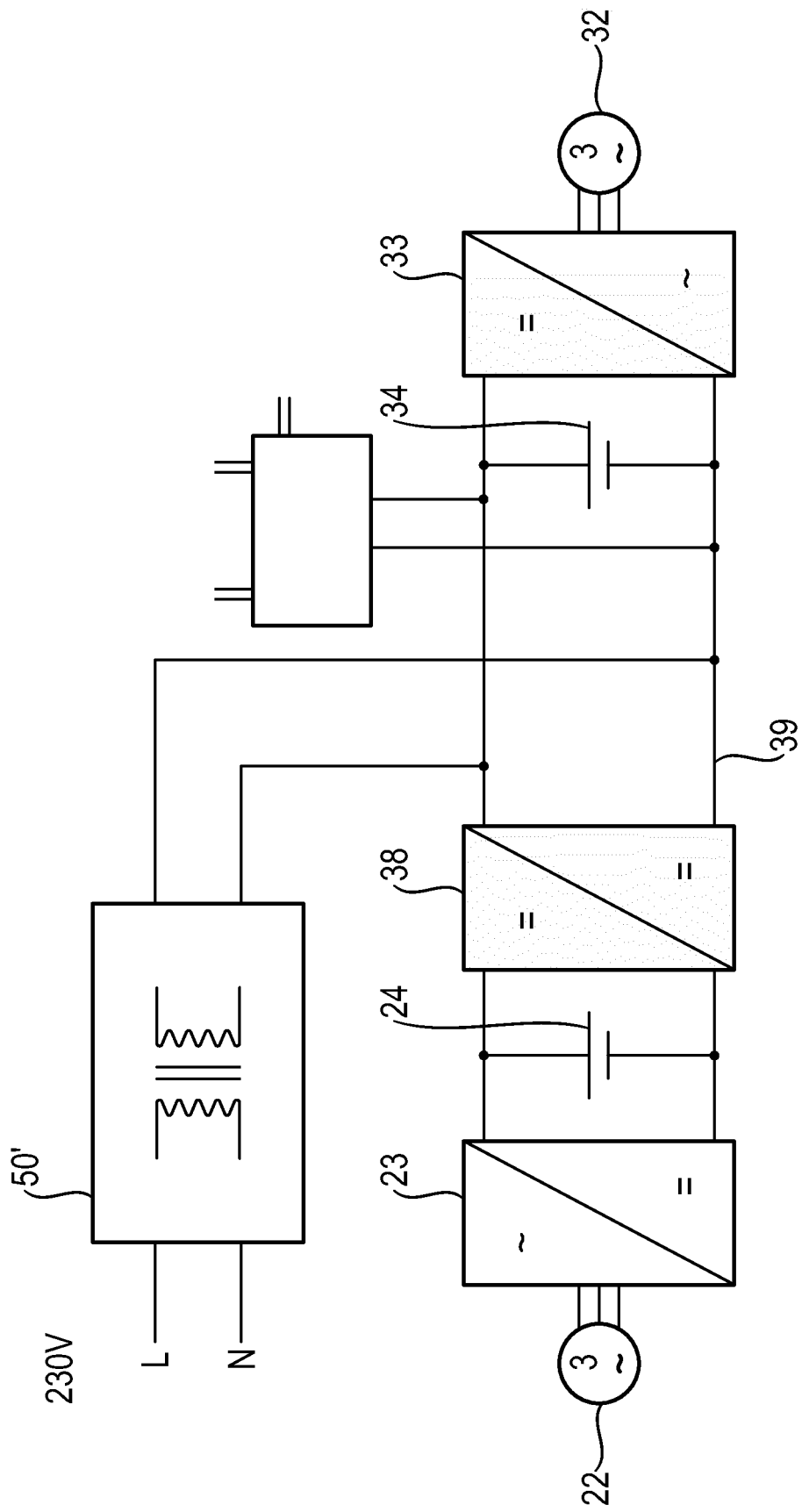
FIG. 1 shows an electric machine arrangement according to the prior art.
Figure 2:
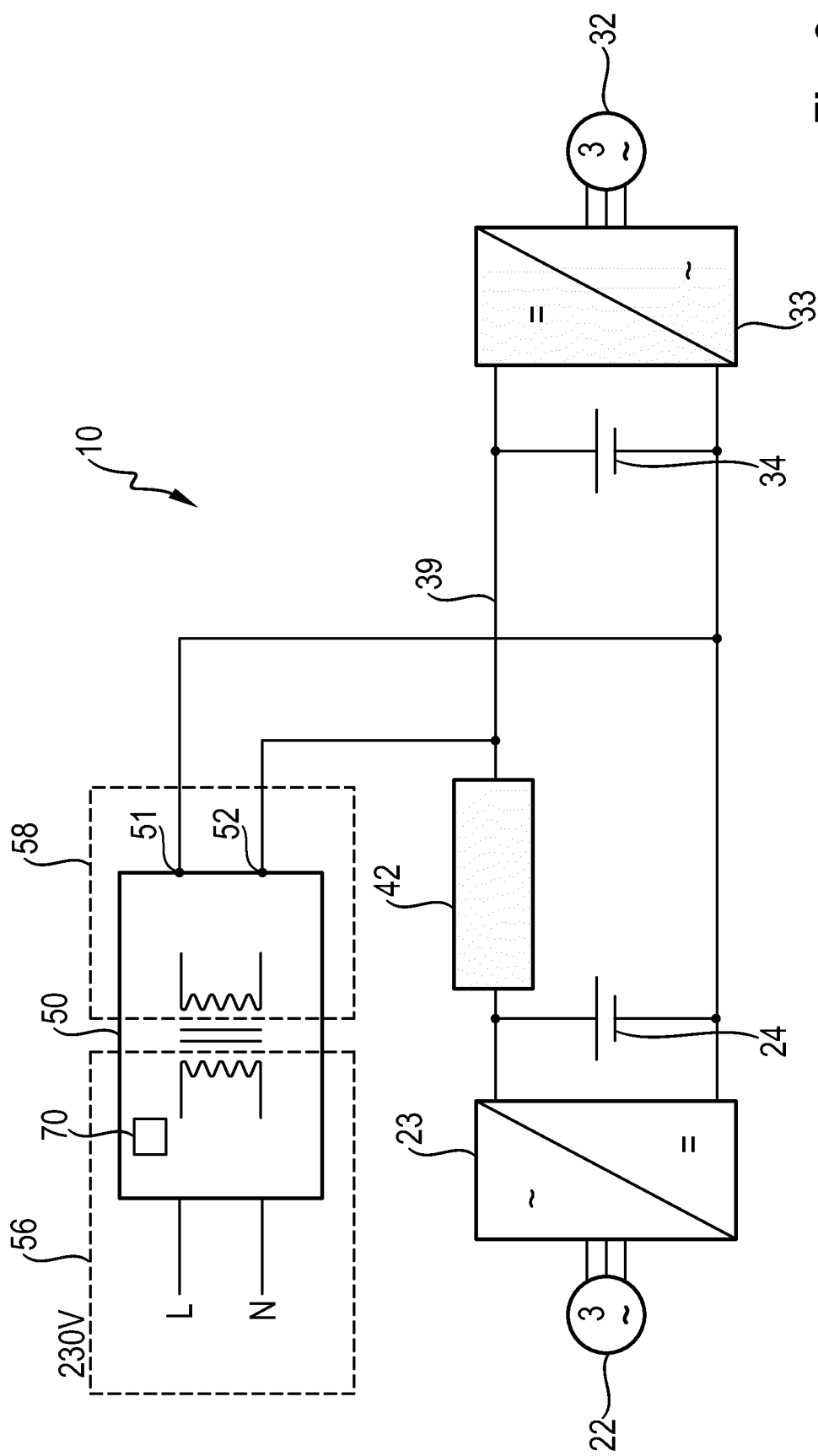
FIG. 2 shows an electric machine arrangement according to one embodiment of the present invention.

FIG. 2 illustrates an embodiment of an electric machine arrangement 10 which is usually installed in a motor vehicle. In FIG. 2, identical reference signs are used for identical elements, as have already been partly described with reference to FIG. 1. A first electric machine 22 (in this case illustrated schematically and by way of example in a three-phase manner) is supplied with power by a first energy store 24 via an inverter 23. A second electric machine 32 (in this case likewise illustrated schematically and by way of example in a three-phase manner) is supplied with power by a second energy store 34 via an inverter 33.

Figure 3:
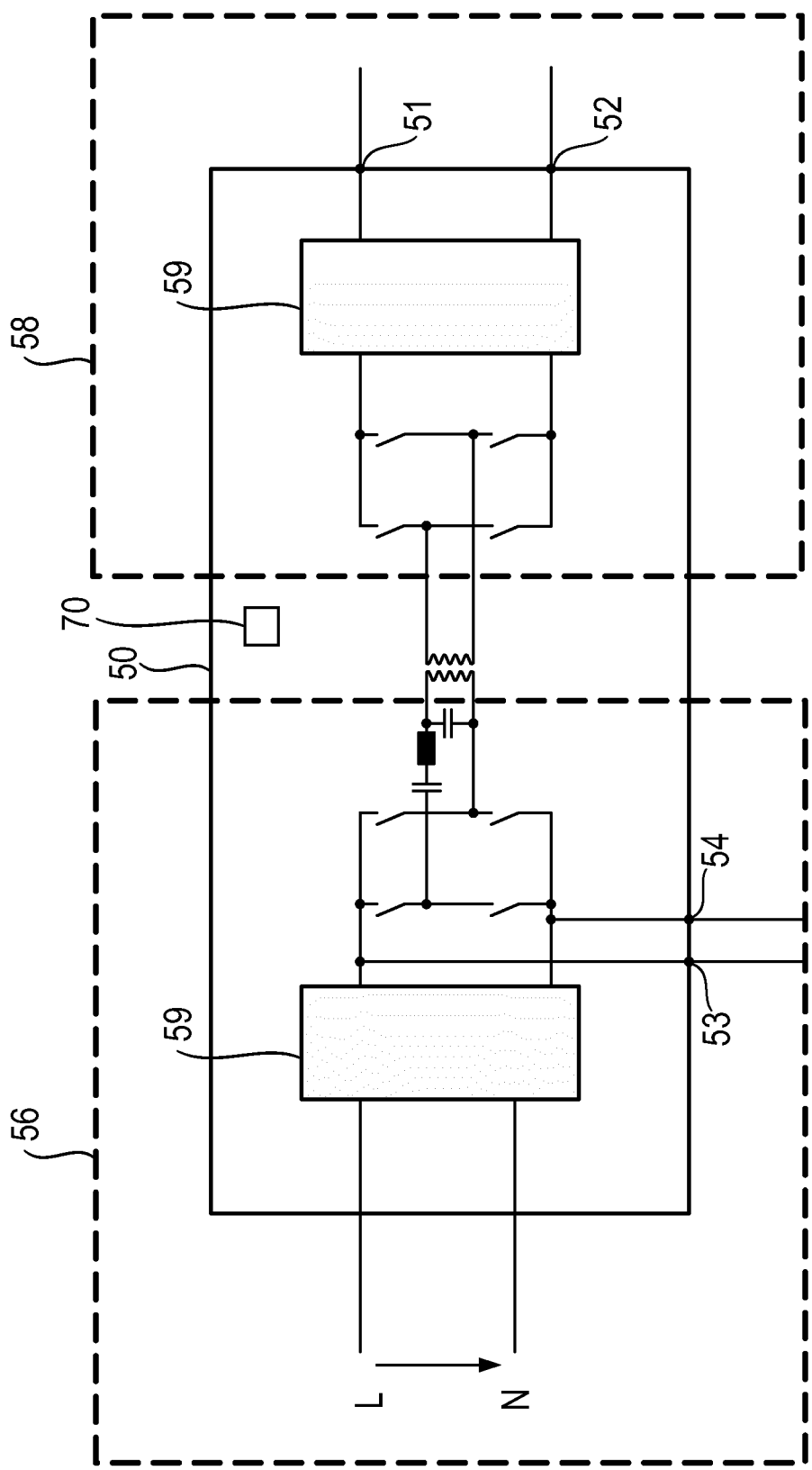
FIG. 3 shows an example of a charging device suitable for the electric machine arrangement according to the invention.

A charging device 50 is provided for charging the energy store 34. The charging device 50 has on a primary side 56 a first terminal having the terminal poles L and N, which in this case by way of example stand for a "normal" electrical power supply system with 230 V. The charging device 50 has on a secondary side 58 a second terminal having the terminal poles 51 and 52, at which the charging device 50 is connected to the intermediate circuit 39 and therefore to the second energy store 34. The basic structure of such a charging device is known. An example of this is described in detail in the book by Helmut Tschöke: "Die Elektrifizierung des Antriebsstrangs" (The electrification of the drivetrain), ISBN 978-3-658-04643-9, in particular pages 80-85. Further components of the charging device 50 (compare FIG. 3), such as, for example, the PFCs (power factor correction devices) 59 and the corresponding switches etc. arranged both on the primary side 56 and on the secondary side 58 for reasons of EMC compatibility, are therefore not described in detail since they can be assumed to be known.

In the intermediate circuit 39, a coupling element 42 (according to the example illustrated in FIG. 4 a diode 43) or a coupling element 44 (according to the example illustrated in FIG. 5, a diode 43 having a power transistor 46 such as a MOSFET or an IGBT connected in parallel therewith, compare FIG. 5) is connected between the two energy stores 24, 34.

As can be seen from FIG. 2, when the voltage in the intermediate circuit 39 increases, it is not only the second energy store 34 that can be charged but also the first energy store 24 by means of the coupling element 42 (or by means of the coupling element 44).

Figure 5:
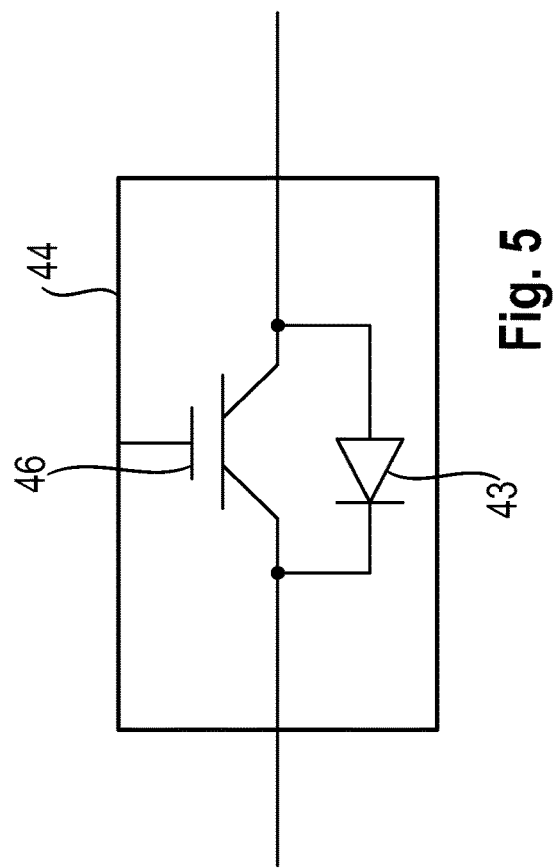
FIG. 5 shows a second example for the realization of a coupling element.
Figure 4:
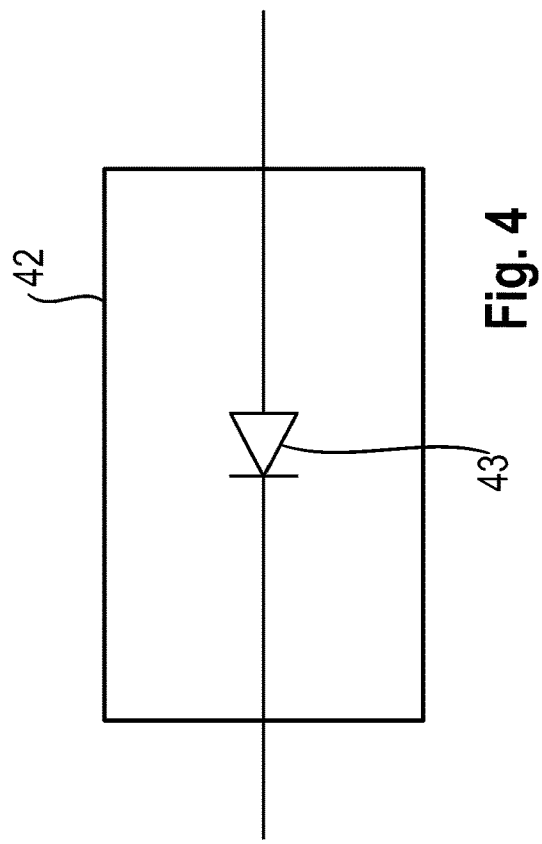
FIG. 4 shows a first example for the realization of a coupling element.

If a coupling element 42 according to FIG. 4 is used, the second electric machine 32 is fed only from the second energy store 34 due to the blocking effect of the diode 43. In contrast, if a coupling element 44 according to FIG. 5 is used, the second electric machine 32 can be fed by both energy stores 24, 34 by switching on the power transistor 46. In this case, for example when energy is transmitted from the second energy store 34 to the first energy store 24, the forward losses of the coupling element 44 can be reduced by switching on the power transistor 46. In this embodiment, a control circuit 70 is provided for this purpose. The control circuit 70 is preferably furthermore configured so that, in addition to turning on the power transistor 46, it can also switch over the load flows in such a way that energy can be transmitted from the first energy store 24 via the power transistor 46 of the coupling element 44 to the second energy store 34, which may be advantageous, for example, during recuperation.

Figure 6A:
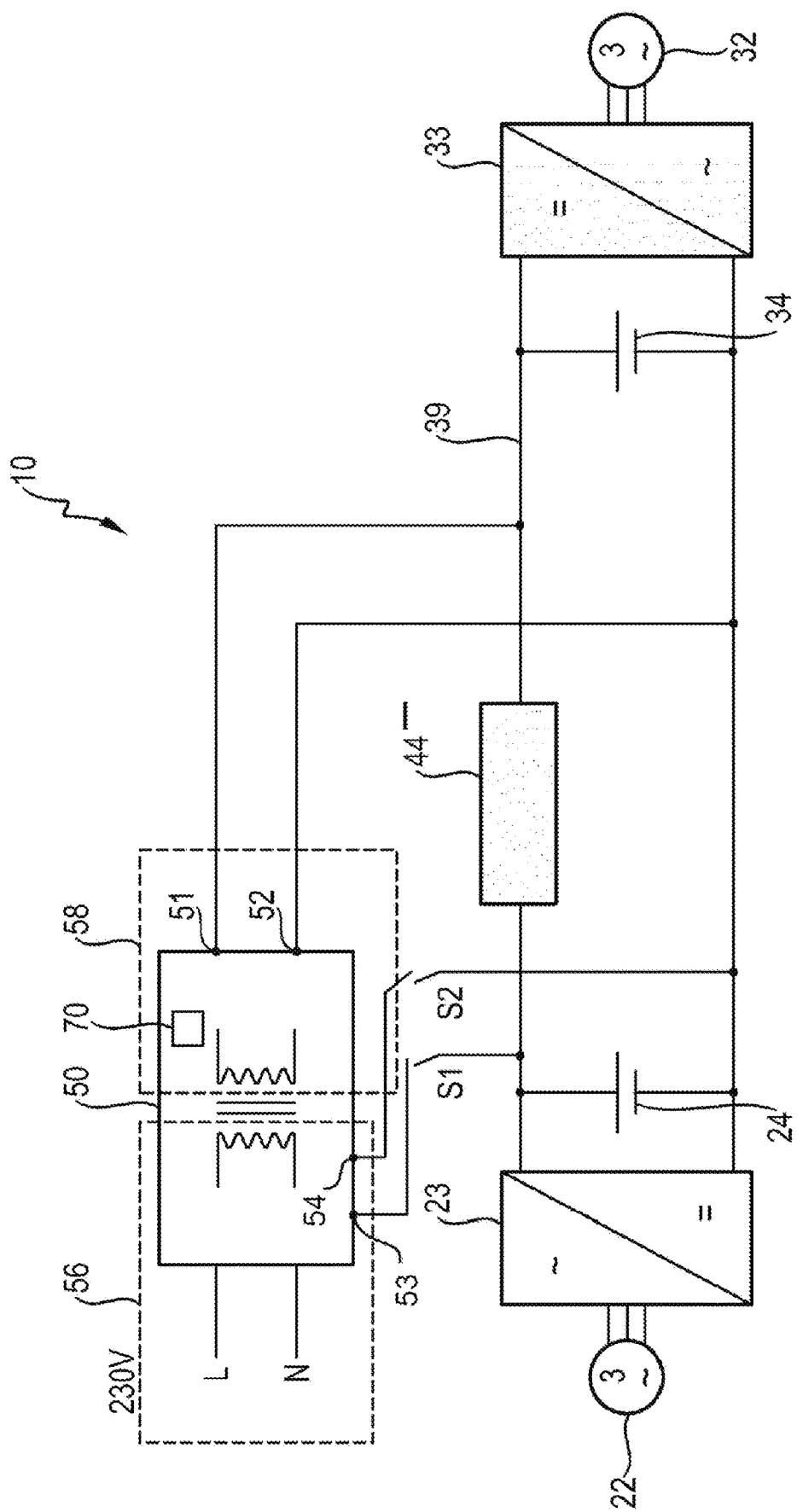
FIGS. 6A and 6B show an electric machine arrangement according to a further embodiment of the present invention.
Figure 6B:
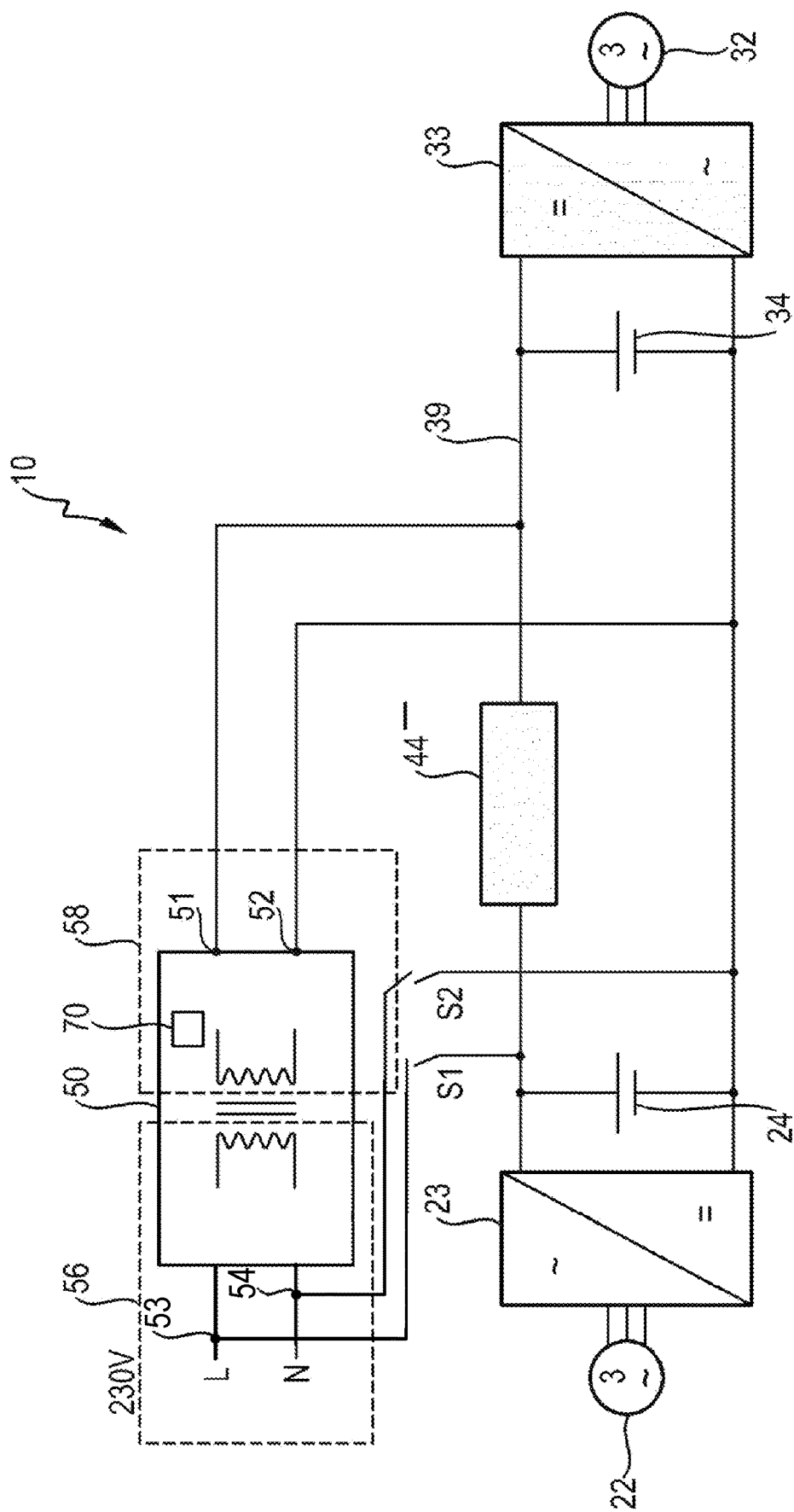

FIG. 6 illustrates a further embodiment of the electric machine arrangement 10 according to the invention. In this embodiment, the charging device 50 furthermore has a third terminal having the terminal poles 53 and 54, compare also FIG. 3, which are connected on the primary side 56 to the lines leading to the terminal poles L and N, respectively. The two terminal poles 53 and 54 can be connected to the first energy store 24 by way of a switching arrangement (having the switches S1 and S2). Finally, the charging device 50 according to the invention has the control circuit 70 (illustrated only schematically).

The control circuit 70 is designed so that it can also switch over the load or current flows in the charging device 50 so that, on the one hand, current can flow from the first terminal poles L, N over the primary side 56 to the secondary side 58 and then further to the second energy store 34 via the second terminal poles 51, 52, whereby said second energy store can be charged. In this case, the control circuit 70 ensures that the switching arrangement having the switches S1 and S2 is open and therefore there is no connection between the two terminal poles 53, 54 and the first energy store 24. On the other hand, the control circuit 70 can close the two switches S1 and S2 and switch the load currents (for example during travel) so that current flows from the second energy store 34 via the second terminal poles 51, 52, the secondary side 58 and the primary side 56 via the two terminal poles 53 and 54 and the closed switches S1 and S2 to the first energy store 24 and charges same. In this embodiment of the electric machine arrangement 10 according to the invention, the charging device 50 therefore functions as a DC/DC converter and therefore makes it possible to save an otherwise required separate DC/DC converter. Since, owing to the recharging to the maximum voltage in the first energy store 24, the intermediate circuit voltage also reaches a maximum, the power of the second electric machine also increases accordingly, since its power is likewise proportional to the voltage in the intermediate circuit.

As an alternative, the arrangement can be such that, instead of the described one control circuit 70, which can execute all of the mentioned control functions, provision is made of separate control circuits for actuating the power transistor 46 of the coupling element 44 on the one hand and for actuating or controlling the charging device 50 on the other hand.

It should be noted that the features of the invention described with reference to individual embodiments or variants, such as, for example, the type and configuration of the individual coupling elements, switches, energy stores and electric machines and further components, and the spatial arrangement thereof, can also be present in other embodiments, unless stated otherwise or automatically ruled out for technical reasons. In addition, all of the features from amongst features of this kind, described in combination, of individual embodiments do not necessarily always have to be realized in a respective embodiment.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electric machine arrangement for a motor vehicle, comprising:
    a first electric machine;
    a first energy store connected to the first electric machine for supplying electrical power thereto;
    a second electric machine;
    a second energy store connected to the second electric machine for supplying electrical power thereto and connected to the first energy store via an intermediate circuit, wherein
        the first electrical machine and the second electrical machine are each coupled to respectively drive two axles of the motor vehicle;
    a two-pole coupling element connected into the intermediate circuit and comprising two load terminals, said two-pole coupling element permitting energy to be transmitted from the second energy store to the first energy store and being capable of preventing energy from being transmitted from the first energy store to the second energy store; and
    a charging device to connect to an alternating current (AC) electrical power supply system, to the intermediate circuit, and to the second energy store, to charge the first and second energy stores, wherein
        the charging device is connected to the intermediate circuit such that it charges the first and second energy stores via the AC electrical power supply by increasing a direct current (DC) voltage in the intermediate circuit; and
        the charging device is connected in parallel with the coupling element between the first energy store and the second energy store and serves as a DC/DC converter for transmitting energy from the second energy store to the first energy store, wherein
        the charging device serves for charging the first and second energy stores of the electric machine arrangement and comprises:
            a primary side having a first terminal for connection to the AC electrical power supply system,
            a secondary side having a second terminal for connection to the second energy store,
            a third terminal on the primary side thereof for connection to the first energy store, and
            a control circuit for switching over load flows such that energy is transmittable from the second energy store via the second terminal to the first energy store via the third terminal.

2. The electric machine arrangement as claimed in claim 1, wherein the two-pole coupling element comprises a diode.

3. The electric machine arrangement as claimed in claim 1, wherein
    the two-pole coupling element comprises a diode and a power transistor connected in parallel therewith; and
    the control circuit is provided for turning on the power transistor and for switching load flows such that energy is transmitted from the first energy store via the power transistor of the coupling element to the second energy store.

4. The electric machine arrangement as claimed in claim 1, wherein
the third terminal and the first terminal are integrated to form a joint terminal.

5. The electric machine arrangement as claimed in claim 1, further comprising:
a switching arrangement provided to produce and disconnect a connection between the first energy store and the third terminal of the charging device.

6. The electric machine arrangement as claimed in claim 1, wherein
the first energy store is an energy store having power-optimized cells for providing a high power, and
the second energy store is an energy store having energy-optimized cells for providing a high energy.

7. The electric machine arrangement as claimed in claim 1, wherein
the charging device is configured to charge the first energy store and for charging the second energy store to a voltage of 200 to 1000 V.

8. The electric machine arrangement as claimed in claim 7, wherein
the charging device is configured to charge the first energy store and for charging the second energy store to a voltage of 260 to 400 V.

9. A motor vehicle, comprising an electric machine arrangement as claimed in claim 1.

10. The electric machine arrangement as claimed in claim 1, wherein
the energy is permitted to be transmitted from the second energy store to the first energy store when the first terminal of the charging device is unconnected.

11. The electric machine arrangement as claimed in claim 1, wherein
the energy is permitted to be transmitted from the second energy store to the first energy store when the charging device is not connected to the AC electrical power supply system.

* * * * *